(12) United States Patent
Choi et al.

(10) Patent No.: US 6,753,851 B2
(45) Date of Patent: Jun. 22, 2004

(54) OPTICAL MOUSE HAVING DYNAMIC RANGE

(75) Inventors: Won-Tae Choi, Kyungki-do (KR); Bang-Won Lee, Kyungki-do (KR)

(73) Assignees: Samsung Electro-Mechanics Co., Ltd., Kyungki-do (KR); ATLab Inc., Kyungki-do (KR)

( * ) Notice: Subject to any disclaimer, the term of this patent is extended or adjusted under 35 U.S.C. 154(b) by 252 days.

(21) Appl. No.: 09/994,065

(22) Filed: Nov. 27, 2001

(65) Prior Publication Data

US 2003/0048255 A1 Mar. 13, 2003

(30) Foreign Application Priority Data

Sep. 11, 2001 (KR) .................................... 2001-0056006

(51) Int. Cl.[7] ............................................... G09G 5/08
(52) U.S. Cl. ...................... 345/166; 341/139; 345/163
(58) Field of Search ................................ 345/166, 163; 348/229.1, 362, 363; 341/126, 131, 139, 155–6, 158–9, 161

(56) References Cited

U.S. PATENT DOCUMENTS

| 4,771,267 A | * | 9/1988 | Russell, Jr. et al. ......... 341/118 |
| 5,973,674 A | * | 10/1999 | Buecker ..................... 345/166 |
| 2002/0080247 A1 | * | 6/2002 | Takahashi et al. ............ 171/14 |

* cited by examiner

*Primary Examiner*—Joseph Mancuso
*Assistant Examiner*—Laurel E. LeFlore
(74) *Attorney, Agent, or Firm*—Lowe Hauptman Gilman & Berner LLP

(57) ABSTRACT

An optical mouse of a dynamic range has an analog/digital (A/D) converter having an input range adjusted based on an input range control signal, the A/D converter receiving an input signal over the adjusted input range and converting the received signal into digital data, and an image data processor for determining on the basis of image data from the A/D converter whether a data concentrated distribution has occurred, detecting a level of the input range with the data concentrated distribution upon determining that the data concentrated distribution has occurred, outputting the input range control signal to the A/D converter according to the detected level and processing the image data from the A/D converter to detect motion data therefrom.

12 Claims, 6 Drawing Sheets

OPTICAL MOUSE HAVING DYNAMIC RANGE

BACKGROUND OF THE INVENTION

1. Field of the Invention

The present invention relates to an optical mouse having a dynamic range, and more particularly to an optical mouse having a dynamic range, which is capable of adjusting an input range of an analog/digital (A/D) converter on the basis of a magnitude variation of an output signal from the A/D converter to increase a resolution of the A/D converter relative to a low illumination range or fine illumination range, thereby improving the ability of the converter to sense a fine signal variation.

2. Description of the Related Art

An optical mouse generally comprises an image sensor for sensing an image of a motion and outputting the resulting image signal, an A/D converter for converting the image signal from the image sensor into digital data, an image processor for performing a signal processing operation for the digital data from the A/D converter to detect the motion therefrom, and a controller for providing data corresponding to the detected motion to a computer.

Note that the A/D converter in the optical mouse has a fixed input range. With the A/D converter having the fixed input range, the optical mouse can desirably obtain a relatively accurate image in the case of inputting a signal of an amount of light within a certain range, but has the disadvantage of being incapable of obtaining an accurate image in the case of inputting a signal of an amount of light beyond the certain range. In order to make up for this problem, automatic gain control means is generally used to limit a signal magnitude of input light to the optical mouse.

FIG. 1 is a block diagram showing a circuit construction of a conventional optical mouse. As shown in this drawing, the conventional optical mouse comprises a light source 11 for emitting light to an object 1 such as a mouse pad, an image sensor 12 for sensing an image of the object 1, a shutter/controller unit 13 for limiting the magnitude of the image signal from the image sensor 12, an A/D converter 14 for converting an analog image signal from the shutter/controller unit 13 into digital image data, an image data processor 15 for processing the image data from the A/D converter 14 to detect motion data therefrom, and a system controller 16 for sending the motion data from the image data processor 15 to a computer.

In the above-mentioned conventional optical mouse, an input signal under the condition of an appropriate illumination or of incident light of high intensity has such a sufficient variation as to be converted according to a predetermined resolution of the A/D converter. Alternatively, where the incident light is small in amount, the shutter is opened for a period of time long enough to adjust a dark object to a proper brightness, but the input signal becomes that much smaller in variation. In other words, the dark object is extremely small in reflected light amount, resulting in there being a very small difference between a noise level and a signal level. As a result, provided that a signal incoming from the object is amplified, it will become a signal as shown in FIG. 2a because a noise level is also amplified, although the figure of the object is well visible. If the object is accurately centered on the image sensor, this sensor will provide a signal distribution as shown in FIG. 2b. For the effective detection of a motion by the optical mouse, it is preferable that a detected signal has a magnitude distributed uniformly over the entire input range of the A/D converter. However, in the case where the detected signal is under the condition of a low illumination, the magnitude thereof leans to a certain level of the entire input range of the A/D converter, or a low level.

By opening the shutter for a lengthy period of time under the above condition, the signal magnitude can be increased from a signal distribution SD1 to SD2 as shown in FIG. 2c. It is preferable that the detected signal varies over the entire input range of the A/D converter, but it varies over a small range under the condition of a low illumination. This signifies that an 8-bit A/D converter provides its output signal having a variation of, for example, 4 bits.

In other words, the magnitude of the detected signal input to the A/D converter 14 varies with an image, or light and dark regions on the pad for the optical mouse. Where the light and dark regions of the pad have a low contrast, the magnitude of the detected signal is distributed concentratedly (referred to hereinafter as 'data concentrated distribution') at a certain level of the entire input range of the A/D converter 14. For example, the data concentrated distribution may be present at any one of a high level, middle level and low level of the entire input range of the A/D converter 14.

Provided that the data concentrated distribution occurs as described above, the data magnitude will have a fine variation, thereby making it difficult for the optical mouse to detect a motion. In this case, there is a need for a technique to adjust the input range of the A/D converter about the level at which the data concentrated distribution occurs, thereby enabling the optical mouse to detect a fine motion.

SUMMARY OF THE INVENTION

Therefore, the present invention has been made in view of the above problems, and it is an object of the present invention to provide an optical mouse having a dynamic range, which is capable of adjusting an input range of an analog/digital converter on the basis of a magnitude variation of an output signal from the analog/digital converter to increase a resolution of the analog/digital converter relative to a low illumination range or fine illumination range, thereby improving the ability of the converter to sense a fine signal variation.

In accordance with the present invention, the above and other objects can be accomplished by the provision of an optical mouse having a dynamic range, comprising analog/digital (A/D) conversion means having an input range adjusted based on an input range control signal, the A/D conversion means receiving an input signal over the adjusted input range and converting the received signal into digital data; and image data processing means for determining on the basis of image data from the A/D conversion means whether a data concentrated distribution has occurred, detecting a level of the input range with the data concentrated distribution upon determining that the data concentrated distribution has occurred, outputting the input range control signal to the A/D conversion means according to the detected level and processing the image data from the A/D conversion means to detect motion data therefrom.

Preferably, the image data processing means may subdivide a data concentrated distribution degree (data concentration degree) related to a magnitude variation of a detected signal and determine the input range of the A/D conversion means on the basis of the data concentration degree. In this case, the input range of the A/D conversion means can be adjusted more precisely centering around a data concentrated distribution area. Further, the resolution of the A/D conversion means is applied to a small, adjusted input range relative to the entire input range of the A/D conversion means, so that it can be increased relatively. Therefore, the A/D conversion means can detect a fine magnitude variation of the detected signal.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
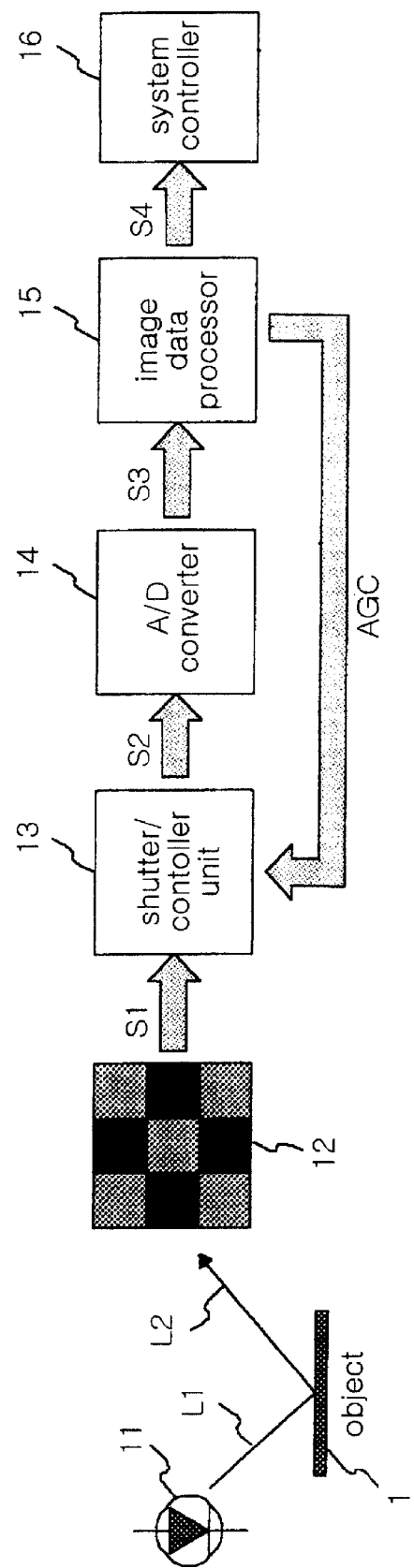
FIG. 1 is a block diagram showing a circuit construction of a conventional optical mouse.

The construction and operation of an optical mouse with a dynamic range according to the present invention will now be described in detail with reference to the accompanying drawings. In the drawings, the same or similar elements are denoted by the same reference numerals even though they are depicted in different drawings.

Figure 3:
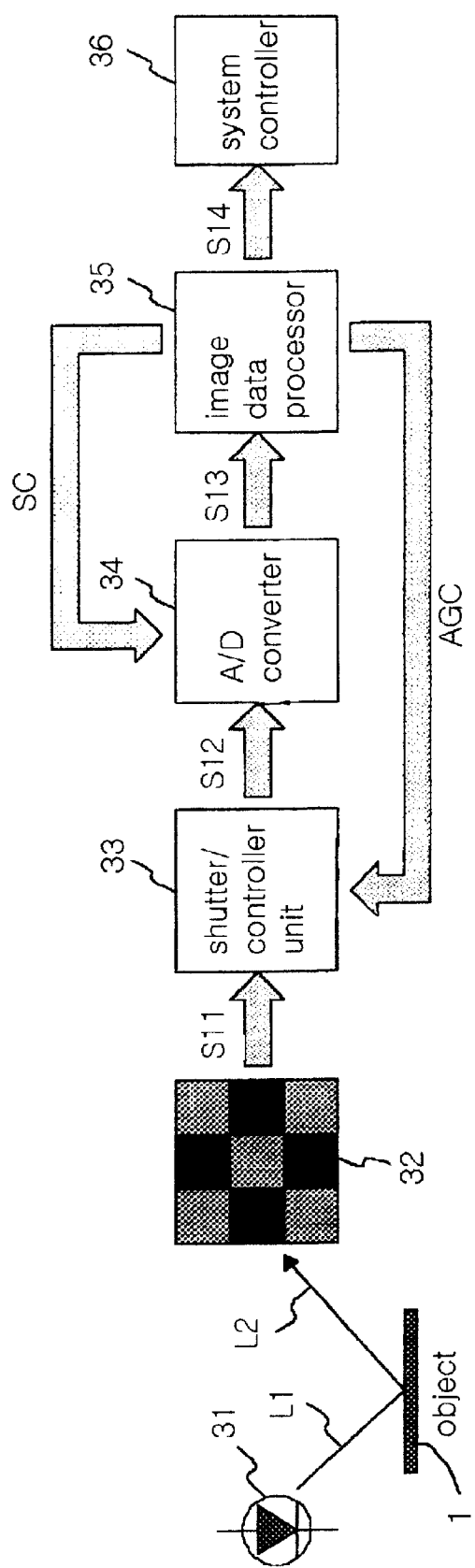
FIG. 3 is a block diagram showing a circuit construction of an optical mouse in accordance with the present invention.

FIG. 3 is a block diagram showing a circuit construction of the optical mouse with the dynamic range in accordance with the present invention. As shown in this drawing, the present optical mouse comprises a light source 31 for emitting light to an object 1, and an image sensor 32 for sensing an image of the object 1. A description related to a clock signal (timing signal) will be omitted because it is well known in the art. The following description will thus be given centering around an operation of adjusting an input range of an analog/digital (A/D) converter on the basis of a data concentrated distribution.

The present optical mouse further comprises an A/D converter 34 having an input range adjusted based on an input range control signal SC. The A/D converter 34 is adapted to receive an input signal S12 over the adjusted input range and convert the received signal into digital data. An image data processor 35 is provided in the optical mouse to determine on the basis of image data S13 from the A/D converter 34 whether a data concentrated distribution has occurred, detect a level of the input range with the data concentrated distribution upon determining that the data concentrated distribution has occurred, and then output the input range control signal SC to the A/D converter according to the detected level. The image data processor 35 is further adapted to process the image data S13 from the A/D converter 34 to detect motion data therefrom.

The present optical mouse may selectively comprise a shutter/controller unit 33 for determining a signal limit range in response to an automatic gain control signal AGC to limit the magnitude of an image signal from the image sensor 32. In the case where light incoming from the object is too high in intensity under the condition that the shutter/controller unit 33 is provided in the optical mouse, the image data processor 35 provides the automatic gain control signal AGC based on the level of the image data S13 from the A/D converter 34 to the shutter/controller unit 33 to somewhat limit a signal magnitude corresponding to the light intensity.

The optical mouse of the present invention further comprises a system controller 36 for sending the motion data from the image data processor 35 to a computer.

Figure 4:
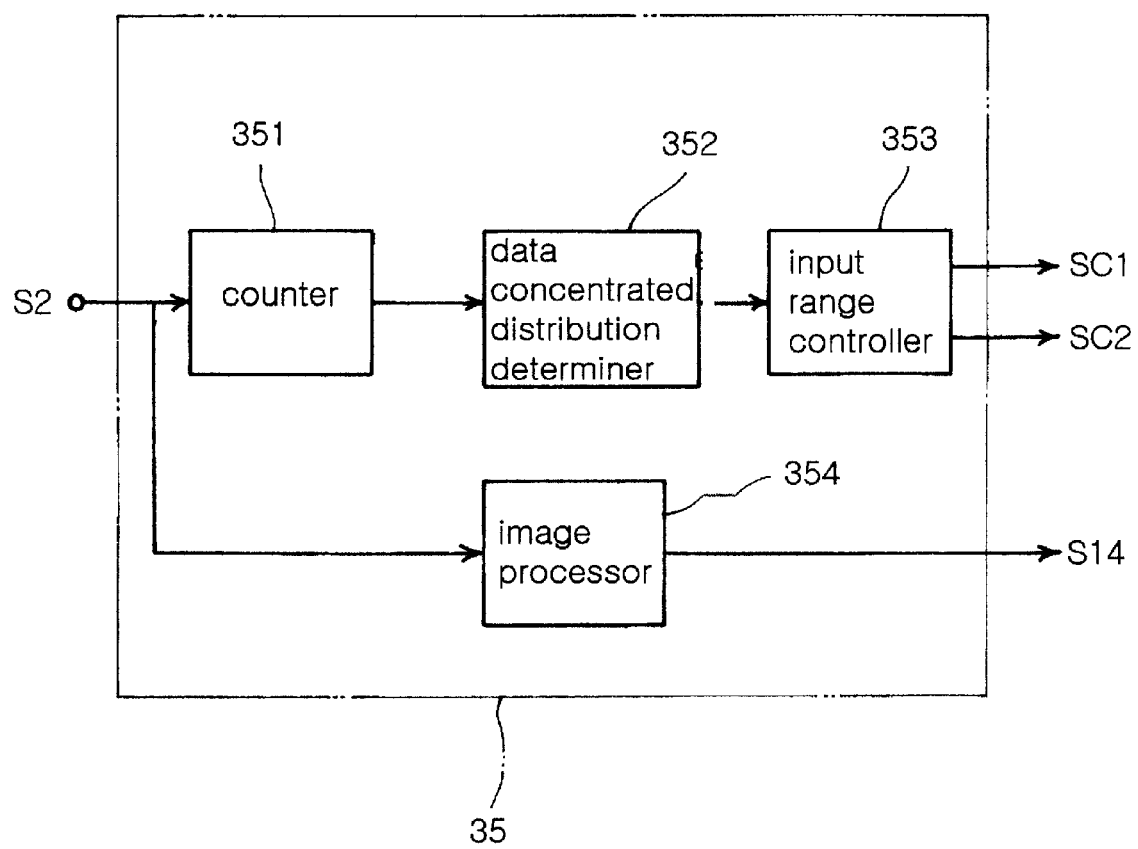
FIG. 4 is a block diagram showing a circuit construction of an image data processor in FIG. 3.

FIG. 4 is a block diagram showing a circuit construction of the image data processor 35 in FIG. 3. As shown in this drawing, a first embodiment of the image data processor 35 includes a counter 351 for counting the image data from the A/D converter 34 by levels, a data concentrated distribution determiner 352 for comparing an output count from the counter 351 with a reference data concentrated distribution value to determine whether it exceeds the reference value and providing level information corresponding to the data concentrated distribution as a result of the determination, an input range controller 353 responsive to the level information from the data concentrated distribution determiner 352 for generating a first control signal SC1 to adjust the level of a reference voltage and a second control signal SC2 to adjust the level of a detected signal, respectively, and an image processor 354 for processing the image data S13 from the A/D converter 34 to detect the motion data therefrom.

A second embodiment of the image data processor 35 includes a counter 351 for counting the image data S13 from the A/D converter 34 by levels, and a data concentrated distribution determiner 352 for setting a plurality of reference data concentrated distribution values to determine the degree of the data concentrated distribution by steps, comparing an output count from the counter 351 with each of the reference data concentrated distribution values and then providing level information and concentration degree information corresponding to the data concentrated distribution as a result of the comparison. The second embodiment of the image data processor 35 further includes an input range controller 353 responsive to the level information and concentration degree information from the data concentrated distribution determiner 352 for generating a first control signal SC1 to adjust the level of a reference voltage and a second control signal SC2 to adjust the level of a detected signal, respectively, and an image processor 354 for processing the image data S13 from the A/D converter 34 to detect the motion data therefrom.

Figure 5:
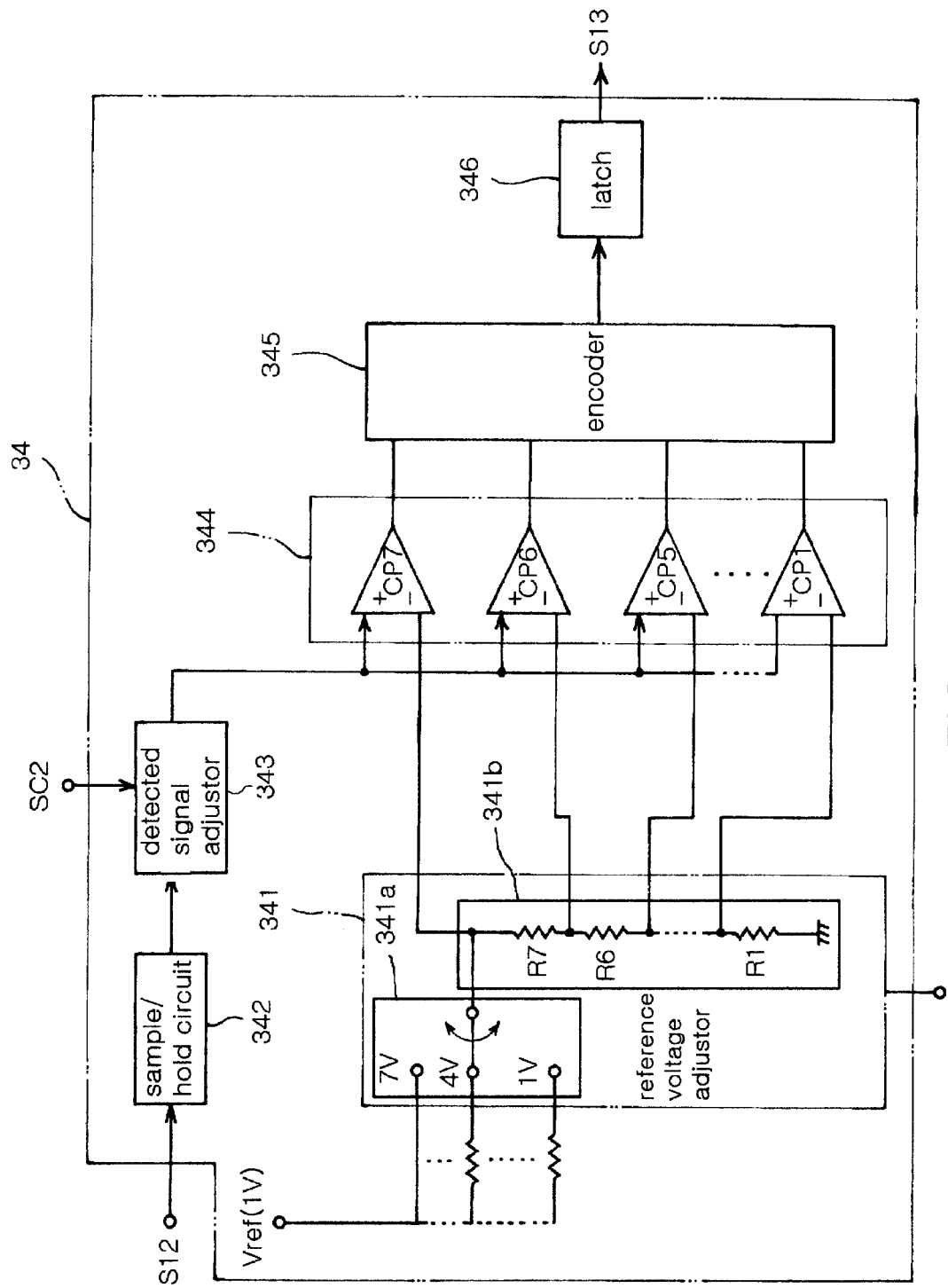
FIG. 5 is a block diagram showing a circuit construction of an analog/digital (A/D) converter in FIG. 3.

FIG. 5 is a block diagram showing a circuit construction of the A/D converter 34 in FIG. 3. As shown in this drawing, the A/D converter 34 includes a reference voltage adjustor 341 for adjusting the level of the reference voltage in response to the first control signal SC1, a sample/hold circuit 342 for sampling and holding the input signal S12 to output the detected signal, a detected signal adjustor 343 for adjusting the level of the detected signal from the sample/hold circuit 342 in response to the second control signal SC2, a comparison circuit 344 for comparing the level of the detected signal adjusted by the detected signal adjustor 343 with the level of the reference voltage adjusted by the reference voltage adjustor 341, an encoder 345 for encoding an output signal from the comparison circuit 344 into serial data, and a latch 346 for latching output data from the encoder 345 until the subsequent data input.

The reference voltage adjustor 341 includes a reference voltage switch 341a for switching the reference voltage in response to the first control signal SC1, and a resistor chain 341b for dividing the reference voltage switched by the reference voltage switch 341a into a plurality of reference voltages and outputting the divided reference voltages to the comparison circuit 344. The resistor chain 341b is provided with a plurality of resistors R1–R7 connected in series.

The comparison circuit 344 includes a plurality of comparators CP1–CP7 connected in parallel for comparing the level of the detected signal adjusted by the detected signal adjustor 343 with the levels of the reference voltages from the resistor chain 341b in the reference voltage adjustor 341, respectively.

Figure 6:
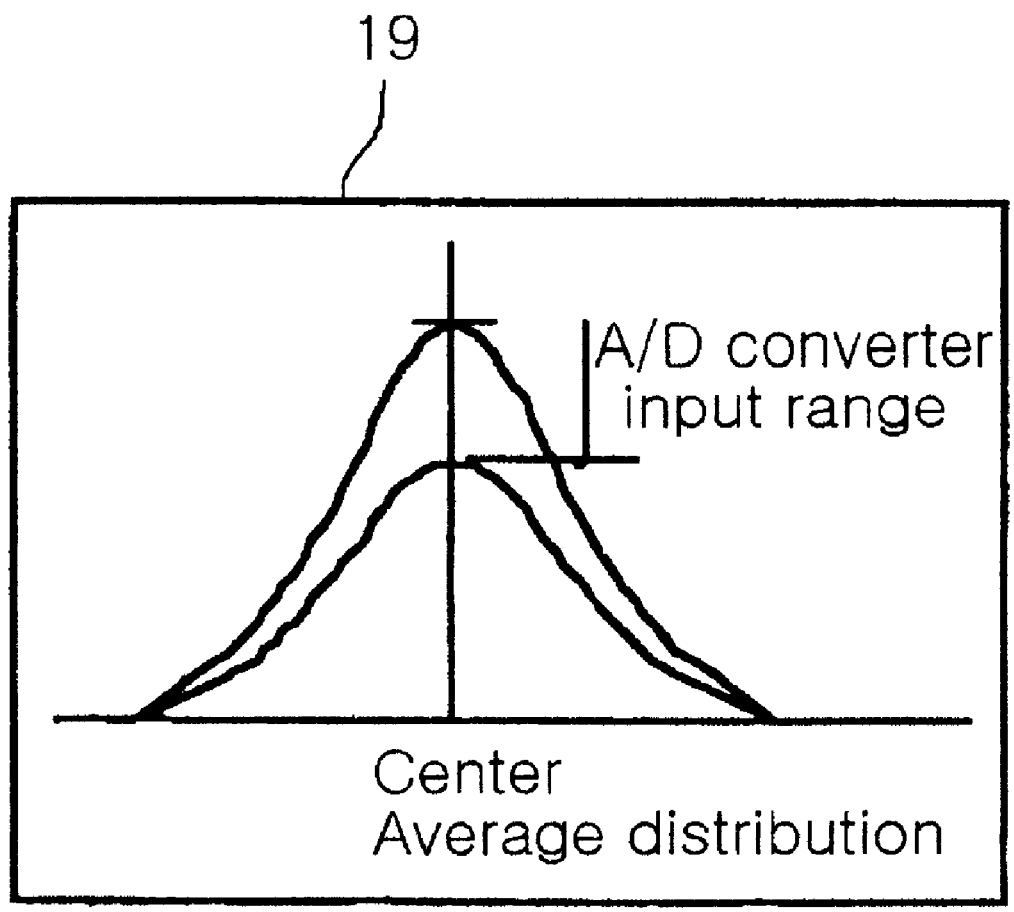
FIG. 6 is a view illustrating an input range of the A/D converter.

FIG. 6 is a view illustrating an input range of the A/D converter. As seen from this drawing, according to the present invention, the input range of the A/D converter is adjusted to a high level of the entire input range.

A detailed description will hereinafter be given of the operation of the optical mouse with the above-stated construction in accordance with the present invention.

First, referring to FIG. 3, in the optical mouse having the dynamic range according to the present invention, the light source 31 emits light to the object 1, and the image sensor 32 then senses an image of the object 1.

The A/D converter 34 has an input range adjusted based on an input range control signal SC. The A/D converter 34 receives an input signal S12 over the adjusted input range, converts the received signal into digital data and then provides the converted digital data to the image data processor 35.

The image data processor 35 determines on the basis of image data S13 from the A/D converter 34 whether a data concentrated distribution has occurred. Upon determining that the data concentrated distribution has occurred, the image data processor 35 detects a level of the input range at which the data concentrated distribution is present, and then outputs the input range control signal SC to the A/D converter according to the detected level. The image data processor 35 further processes the image data S13 from the A/D converter 34 to detect motion data therefrom.

The shutter/controller unit 33 may selectively be provided in the optical mouse of the present invention. In the case where the shutter/controller unit 33 is provided in the optical mouse and light incoming from the object is too high in intensity, the image data processor 35 provides an automatic gain control signal AGC based on the level of the image data S13 from the A/D converter 34 to the shutter/controller unit 33 to somewhat limit a signal magnitude corresponding to the light intensity. In this case, the shutter/controller unit 33 determines a signal limit range in response to the automatic gain control signal AGC to limit the magnitude of an image signal from the image sensor 32.

Thereafter, the system controller 36 sends the motion data from the image data processor 35 to the computer.

Next, the first embodiment of the image data processor 35 in FIG. 3 will be described with reference to FIG. 4 which is a block diagram showing a circuit construction of the image data processor 35.

In the image data processor 35, first, the counter 351 counts the image data from the A/D converter 34 by levels. In detail, the counter 351 repeatedly inputs data in predetermined bit units, for example, in 8 bit units. That is, the counter 351 inputs a plurality of data corresponding to the magnitude of a detected signal for a predetermined period of time and counts the inputted data by levels. For example, in the case where 60 data are inputted for the predetermined time period and an input range of the detected signal is 1V to 7V, the counter 351 counts the number of data at the respective levels, for example, 0 at 1V, 0 at 2V, 8 at 3V, 40 at 4V, 12 at 5V, 0 at 6V and 0 at 7V.

The data concentrated distribution determiner 352 compares an output count from the counter 351 with a reference data concentrated distribution value to determine whether it exceeds the reference value and provides level information corresponding to the data concentrated distribution as a result of the determination. For example, in the case where the reference data concentrated distribution value is set to 30 (corresponding to 50% of a total number of 60), the data concentrated distribution determiner 352 provides level information of 4V to the input range controller 353 because the output count from the counter 351 is 40, corresponding to the level of 4V, which is greater than the reference value.

In responsive to the level information from the data concentrated distribution determiner 352, the input range controller 353 generates a first control signal SC1 to adjust the level of a reference voltage and a second control signal SC2 to adjust the level of a detected signal, respectively. For example, in the case where the level information is 4V, the input range controller 353 has to, for detection of data corresponding to 3V and 5V around 4V, adjust the level of the reference voltage to a value greater than a voltage range (3V) of 3V to 6V within which data is concentratedly distributed. In this case, the input range controller 353 provides the first control signal SC1 to adjust a reference voltage of 7V to that of 4V. Further, because most of the detected signal magnitude is concentrated on 4V, the input range controller 353 provides a variable 3 for subtraction of a detected voltage level as the second control signal SC2 for adjustment of the detected signal level.

On the other hand, the image processor 354 in the image data processor 35 processes the image data S13 from the A/D converter 34 to detect the motion data therefrom, as in a conventional image data processor. The image processor 354 performs the same function in the respective embodiments of the present invention, and a description thereof will thus be omitted in the following description.

Next, the second embodiment of the image data processor 35 will be described.

In the image data processor 35, first, the counter 351 counts the image data from the A/D converter 34 by levels. In detail, the counter 351 repeatedly inputs data in predetermined bit units, for example, in 8 bit units. That is, the counter 351 inputs a plurality of data corresponding to the magnitude of a detected signal for a predetermined period of time and counts the inputted data by levels. For example, in the case where 60 data are inputted for the predetermined time period and an input range of the detected signal is 1V to 7V, the counter 351 counts the number of data at the respective levels, for example, 0 at 1V, 0 at 2V, 8 at 3V, 40 at 4V, 12 at 5V, 0 at 6V and 0 at 7V.

The data concentrated distribution determiner 352 sets a plurality of reference data concentrated distribution values to determine the degree of the data concentrated distribution by steps. The data concentrated distribution determiner 352 then compares an output count from the counter 351 with each of the reference data concentrated distribution values and provides level information and concentration degree information corresponding to the data concentrated distribution as a result of the comparison. For example, in the case where a total of 60 input data are present for a predetermined period of time, the data concentrated distribution determiner 352 subdivides and sets the reference data concentrated distribution values to 30, 40 and 50, respectively. The data concentrated distribution determiner 352 then compares an output count from the counter 351 with each of the reference data concentrated distribution values to determine a data concentrated distribution degree (data concentration degree 1, 2 or 3) and a data concentrated distribution level on the basis of the output count from the counter 351. The data concentrated distribution determiner 352 thereafter provides data concentrated distribution degree information (data concentration degree information) and data concentrated distribution level information to the input range controller 353 as a result of the determination.

In response to the level information and concentration degree information from the data concentrated distribution determiner 352, the input range controller 353 generates a first control signal SC1 to adjust the level of a reference voltage and a second control signal SC2 to adjust the level of a detected signal, respectively. In the case where the level information is, for example, 4V, the input range controller 353 sets different ranges according to data concentration degrees about 4V. For example, the input range controller 353 may set a range from 3.5V to 5.5V about 4V (input range=2V) in case of concentration degree 1 (above 50 data), from 3V to 6V about 4V (input range=3V) in case of concentration degree 2 (above 40 data), and from 2.5V to 6.5V about 4V (input range=4V) in case of concentration degree 3 (above 30 data), respectively.

First, for detection of data corresponding to 3.5V and 5.5V, the input range controller 353 provides the first control signal SC1 to adjust a reference voltage of 7V to that of 3V such that the reference voltage corresponds to a voltage range (2V) of 3.5V to 5.5V within which data is concentratedly distributed. Further, because most of the detected signal magnitude is concentrated on 4V, the input range controller 353 provides a variable 3.5 for subtraction of a detected voltage level as the second control signal SC2 for adjustment of the detected signal level.

Also, for detection of data corresponding to 3V and 6V, the input range controller 353 provides the first control signal SC1 to adjust the reference voltage of 7V to that of 4V such that the reference voltage corresponds to a voltage range (3V) of 3V to 6V within which data is concentratedly distributed. Further, because most of the detected signal magnitude is concentrated on 4V, the input range controller 353 provides a variable 3 for subtraction of a detected voltage level as the second control signal SC2 for adjustment of the detected signal level.

On the other hand, for detection of data corresponding to 2.5V and 6.5V, the input range controller 353 provides the first control signal SC1 to adjust the reference voltage of 7V to that of 5V such that the reference voltage corresponds to a voltage range (4V) of 2.5V to 6.5V within which data is concentratedly distributed. Further, because most of the detected signal magnitude is concentrated on 4V, the input range controller 353 provides a variable 2.5 for subtraction of a detected voltage level as the second control signal SC2 for adjustment of the detected signal level.

The A/D converter 34 adjusts its input range in response to the first control signal SC1 and second control signal SC2 from the first or second embodiment of the image data processor 35 to increase its resolution relatively, as will hereinafter be described in detail.

With reference to FIG. 5, in the A/D converter 34, first, the reference voltage adjustor 341 adjusts the level of the reference voltage in response to the first control signal SC1 from the input range controller 353. For example, in the case where the reference voltage is 7V, it is switched to 4V when a data concentrated distribution is detected. The reference voltage of 4V is then provided as reference voltages to the subsequent comparators via a resistor chain. In the case where the resistor chain is composed of seven resistors, the increment of each reference voltage is about 0.571V (4V/7 (the number of the resistors)). That is, the comparators are applied respectively with reference voltages increasing by increments of 0.571V, namely, 0.571V, 1.142V, 1.714V, 2.285V, 2.857V, 3.429V and 4V.

The sample/hold circuit 342 in the A/D converter 34 samples and holds the input signal S12 at predetermined periods to provide the detected signal to the detected signal adjustor 343.

The detected signal adjustor 343 adjusts the level of the detected signal from the sample/hold circuit 342 in response to the second control signal SC2 from the input range controller 353. For example, the detected signal adjustor 343 can adjust the level of the detected signal by subtracting the second control signal SC2 from the detected signal. In this case, the second control signal SC2 is a subtraction variable. For the subtraction variable being 3, the detected signal adjustor 343 adjusts the level of the detected signal by subtracting 3 from the detected signal. Provided that the detected signal adjustor 343 adjusts the level of the detected signal down by 3V, the detected signal magnitude first distributed concentratedly on 4V will then be distributed centering around 1V.

On the other hand, the comparison circuit 344 compares the level of the detected signal adjusted by the detected signal adjustor 343 with the level of the reference voltage adjusted by the reference voltage adjustor 341. The comparison circuit 344 may preferably include comparators of the number based on the resolution of the A/D converter. For example, in the case where the A/D converter is of 3 bits, 7 ($2^3-1$) comparators CP1–CP7 connected in parallel are required. In this case, the comparators CP1–CP7 compare the level of the detected signal with the reference voltages, 0.571V, 1.142V, 1.714V, 2.285V, 2.857V, 3.429V and 4V, respectively. As a result of the comparison, the first comparator CP1 outputs "H" when the detected signal is 1.1V, the second comparator CP2 outputs "H" when 1.5V, and the third comparator CP3 outputs "H" when 1.9V.

As described above, when three detected signals are 1.1V, 1.5V and 1.9V, respectively, the optical mouse according to the present invention can detect those signals at different levels. However, in the conventional optical mouse, the increment of each reference voltage is 1V in the case where the first reference voltage is 7V and the resistor chain is composed of seven resistors. For this reason, the conventional optical mouse detects the above three detected signals of 1.1V, 1.5V and 1.9V at the same level.

Therefore, where the detected signal magnitude is concentrated on a specific level while exhibiting a fine variation, the optical mouse according to the present invention can perform the A/D conversion over a range set about the specific level so as to detect a fine motion.

Thereafter, the encoder 345 encodes an output signal from the comparison circuit 344 into serial data in predetermined bit units, and the latch 346 then latches output data from the encoder 345 until the subsequent data input.

Figure 2A:
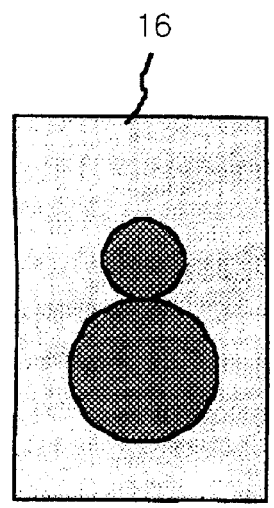
FIGS. 2a to 2c are views illustrating object image and image sensor signal distributions.
Figure 2B:
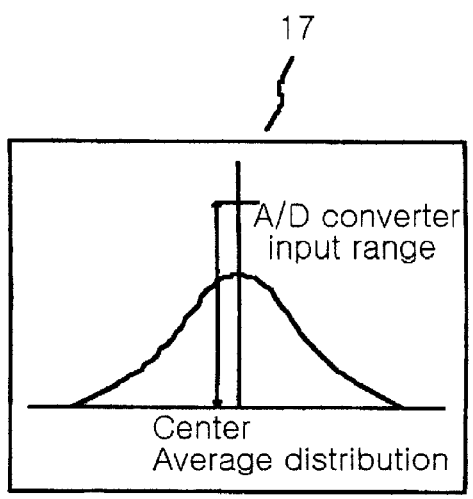
Figure 2C:
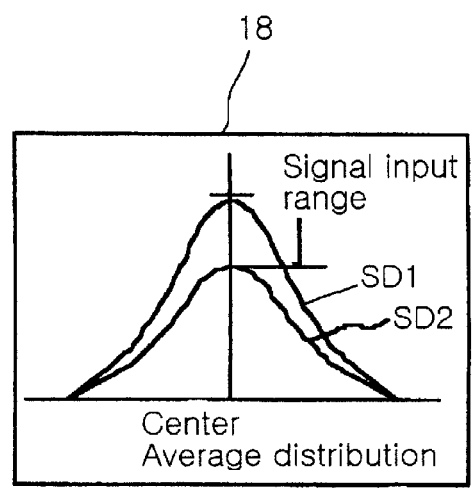

FIG. 6 illustrates an input range of the A/D converter. As seen from this drawing, according to the present invention, the input range of the A/D converter is adjusted to a high level of the entire input range where data is concentrated. In other words, as previously stated, the A/D conversion is performed with respect to data within a range set about the high level where the data concentrated distribution is present. This range is distinguished from the signal input range of the conventional optical mouse as shown in FIG. 2c.

The present invention as stated above is applicable to devices or systems for sensing images using light, such as an image scanner, optical pickup device and the like, as well as the optical mouse.

As apparent from the above description, the present invention provides an optical mouse having a dynamic range, which is capable of adjusting an input range of an analog/digital converter on the basis of a magnitude variation of an output signal from the analog/digital converter to increase a resolution of the analog/digital converter relative to a low illumination range or fine illumination range. Therefore, the present invention has the effect of improving the ability of the analog/digital converter to sense a fine signal variation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An optical mouse having a dynamic range, comprising: analog/digital (A/D) conversion means having an input range adjusted based on an input range control signal, said A/D conversion means receiving an input signal over the adjusted input range and converting the received signal into digital data; and
   image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level and processing the image data from said A/D conversion means to detect motion data therefrom,
   wherein said image data processing means includes:
      a counter for counting the image data from said A/D conversion means by levels;
      a data concentrated distribution determiner for comparing an output count from said counter with a reference data concentrated distribution value to determine whether it exceeds the reference value and providing level information corresponding to the data concentrated distribution as a result of the determination;
      an input range controller responsive to the level information from said data concentrated distribution determiner for generating a first control signal to adjust a level of a reference voltage and a second control signal to adjust a level of a detected signal, respectively.

2. The optical mouse as set forth in claim 1 wherein said A/D conversion means includes:
   a reference voltage adjustor for adjusting the level of the reference voltage in response to the first control signal;
   a sample/hold circuit for sampling and holding the input signal to output the detected signal;
   a detected signal adjustor for adjusting the level of the detected signal from said sample/hold circuit in response to the second control signal;
   a comparison circuit for comparing the level of the detected signal adjusted by said detected signal adjustor with the level of the reference voltage adjusted by said reference voltage adjustor;
   an encoder for encoding an output signal from said comparison circuit into serial data; and
   a latch for latching output data from said encoder until the subsequent data input.

3. An optical mouse having a dynamic range, comprising: analog/digital (A/D) conversion means having an input range adjusted based on an input range control signal, said A/D conversion means receiving an input signal over the adjusted input range and converting the received signal into digital data; and
   image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level and processing the image data from said A/D conversion means to detect motion data therefrom,
   wherein said image data processing means includes:
      a counter for counting the image data from said A/D conversion means by levels;
      a data concentrated distribution determiner for setting a plurality of reference data concentrated distribution values to determine a degree of the data concentrated distribution by steps, comparing an output count from said counter with each of the reference data concentrated distribution values and then providing level information and concentration degree information corresponding to the data concentrated distribution as a result of the comparison;
      an input range controller responsive to the level information and concentration degree information from said data concentrated distribution determiner for generating a first control signal to adjust a level of a reference voltage and a second control signal to adjust a level of a detected signal, respectively.

4. The optical mouse as set forth in claim 3, wherein said A/D conversion means includes:
   a reference voltage adjustor for adjusting the level of the reference voltage in response to the first control signal;
   a sample/hold circuit for sampling and holding the input signal to output the detected signal;
   a detected signal adjustor for adjusting the level of the detected signal from said sample/hold circuit in response to the second control signal;
   a comparison circuit for comparing the level of the detected signal adjusted by said detected signal adjustor with the level of the reference voltage adjusted by said reference voltage adjustor;
   an encoder for encoding an output signal from said comparison circuit into serial data; and
   a latch for latching output data from said encoder until the subsequent data input.

5. An optical mouse having a dynamic range, comprising:
   a light source for emitting light to an object;
   an image sensor for sensing an image of the object;
   analog/digital (A/D) conversion means having an input range adjusted based on an input range control signal, said A/D conversion means receiving an analog image signal from said image sensor over the adjusted input range and converting the received signal into digital data;

image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level and processing the image data from said A/D conversion means to detect motion data therefrom, wherein said image data processing means includes:
a counter for counting the image data from said A/D conversion means by levels;
a data concentrated distribution determiner for comparing an output count from said counter with a reference data concentrated distribution value to determine whether it exceeds the reference value and providing level information corresponding to the data concentrated distribution as a result of the determination;
an input range controller responsive to the level information from said data concentrated distribution determiner for generating a first control signal to adjust a level of a reference voltage and a second control signal to adjust a level of a detected signal, respectively; and
a system controller for sending the motion data from said image data processing means to a computer.

6. The optical mouse as set forth in claim 5, wherein said A/D conversion means includes:
a reference voltage adjustor for adjusting the level of the reference voltage in response to the first control signal;
a sample/hold circuit for sampling and holding the input signal to output the detected signal;
a detected signal adjustor for adjusting the level of the detected signal from said sample/hold circuit in response to the second control signal;
a comparison circuit for comparing the level of the detected signal adjusted by said detected signal adjustor with the level of the reference voltage adjusted by said reference voltage adjustor;
an encoder for encoding an output signal from said comparison circuit into serial data; and
a latch for latching output data from said encoder until the subsequent data input.

7. An optical mouse having a dynamic range, comprising:
a light source for emitting light to an object;
an image sensor for sensing an image of the object;
analog/digital (A/D) conversion means having an input range adjusted based on an input range control signal, said A/D conversion means receiving an analog image signal from said image sensor over the adjusted input range and converting the received signal into digital data;
image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level and processing the image data from said A/D conversion means to detect motion data therefrom, wherein said image data processing means includes:
a counter for counting the image data from said A/D conversion means by levels;
a data concentrated distribution determiner for setting a plurality of reference data concentrated distribution values to determine a degree of the data concentrated distribution by steps, comparing an output count from said counter with each of the reference data concentrated distribution values and then providing level information and concentration degree information corresponding to the data concentrated distribution as a result of the comparison;
an input range controller responsive to the level information and concentration degree information from said data concentrated distribution determiner for generating a first control signal to adjust a level of a reference voltage and a second control signal to adjust a level of a detected signal, respectively; and
an image processor for processing the image data from said A/D conversion means to detect the motion data therefrom; and
a system controller for sending the motion data from said image data processing means to a computer.

8. The optical mouse as set forth in claim 7 wherein said A/D conversion means includes:
a reference voltage adjustor for adjusting the level of the reference voltage in response to the first control signal;
a sample/hold circuit for sampling and holding the input signal to output the detected signal;
a detected signal adjustor for adjusting the level of the detected signal from said sample/hold circuit in response to the second control signal;
a comparison circuit for comparing the level of the detected signal adjusted by said detected signal adjustor with the level of the reference voltage adjusted by said reference voltage adjustor;
an encoder for encoding an output signal from said comparison circuit into serial data; and
a latch for latching output data from said encoder until the subsequent data input.

9. An optical mouse having a dynamic range, comprising:
a light source for emitting light to an object;
an image sensor for sensing an image of the object;
a shutter/controller unit for determining a signal limit range in response to an automatic gain control signal to limit a magnitude of an image signal from said image sensor;
analog/digital (A/D) conversion means having an input range adjusted based on an input range control signal, said A/D conversion means receiving an analog image signal from said shutter/controller unit over the adjusted input range and converting the received signal into digital data;
image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level, providing the automatic gain control signal based on a level of the image data from said A/D conversion means to said shutter/controller unit and processing the image data from said A/D conversion means to detect motion data therefrom, wherein said image data processing means includes:

a counter for counting the image data from said A/D conversion means by levels;

a data concentrated distribution determiner for comparing an output count from said counter with a reference data concentrated distribution value to determine whether it exceeds the reference value and providing level information corresponding to the data concentrated distribution as a result of the determination;

an input range controller responsive to the level information from said data concentrated distribution determiner for generating a first control signal to adjust a level of a reference voltage and a second control signal to adjust a level of a detected signal, respectively; and a system controller for sending the motion data from said image data processing means to a computer.

10. The optical mouse as set forth in claim 9 wherein said A/D conversion means includes:

a reference voltage adjustor for adjusting the level of the reference voltage in response to the first control signal;

a sample/hold circuit for sampling and holding the input signal to output the detected signal;

a detected signal adjustor for adjusting the level of the detected signal from said sample/hold circuit in response to the second control signal;

a comparison circuit for comparing the level of the detected signal adjusted by said detected signal adjustor with the level of the reference voltage adjusted by said reference voltage adjustor;

an encoder for encoding an output signal from said comparison circuit into serial data; and a latch for latching output data from said encoder until the subsequent data input.

11. An optical mouse having a dynamic range, comprising:

a light source for emitting light to an object;

an image sensor for sensing an image of the object;

a shutter/controller unit for determining a signal limit range in response to an automatic gain control signal to limit a magnitude of an image signal from said image sensor;

analog/digital (A/D) conversion means having an input range adjusted based on an input range control signal, said A/D conversion means receiving an analog image signal from said shutter/controller unit over the adjusted input range and converting the received signal into digital data;

image data processing means for determining on the basis of image data from said A/D conversion means whether a data concentrated distribution has occurred, detecting a level of the input range with the data concentrated distribution upon determining that the data concentrated distribution has occurred, outputting the input range control signal to said A/D conversion means according to the detected level, providing the automatic gain control signal based on a level of the image data from said A/D conversion means to said shutter/controller unit and processing the image data from said A/D conversion means to detect motion data therefrom, wherein said image data processing means includes:

a counter for counting the image data from said A/D conversion means by levels;

a data concentrated distribution determiner for setting a plurality of reference data concentrated distribution values to determine a degree of the data concentrated distribution by steps, comparing an output count from said counter with each of the reference data concentrated distribution values and then providing level information and concentration degree information corresponding to the data concentrated distribution as a result of the comparison;

an input range controller responsive to the level information and concentration degree information from said data concentrated distribution determiner for generating a first control signal to adjust a level of a reference voltage and a second control signal to adjust a level of a detected signal, respectively; and an image processor for processing the image data from said A/D conversion means to detect the motion data therefrom; and a system controller for sending the motion data from said image data processing means to a computer.

12. The optical mouse as set forth in claim 11, wherein said A/D conversion means includes:

a reference voltage adjustor for adjusting the level of the reference voltage in response to the first control signal;

a sample/hold circuit for sampling and holding the input signal to output the detected signal;

a detected signal adjustor for adjusting the level of the detected signal from said sample/hold circuit in response to the second control signal;

a comparison circuit for comparing the level of the detected signal adjusted by said detected signal adjustor with the level of the reference voltage adjusted by said reference voltage adjustor;

an encoder for encoding an output signal from said comparison circuit into serial data; and a latch for latching output data from said encoder until the subsequent data input.

* * * * *